United States Patent
Harris

(10) Patent No.: US 8,789,206 B2
(45) Date of Patent: Jul. 22, 2014

(54) LOGIN SYSTEM FOR A GRAPHICAL USER INTERFACE USING A PATTERN THAT PROVIDES FEEDBACK ON THE PATTERN

(75) Inventor: Scott C. Harris, Rancho Sante Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 259 days.

(21) Appl. No.: 13/049,675

(22) Filed: Mar. 16, 2011

(65) Prior Publication Data

US 2012/0042378 A1 Feb. 16, 2012

Related U.S. Application Data

(60) Provisional application No. 61/372,447, filed on Aug. 10, 2010.

(51) Int. Cl.
*G06F 21/00* (2013.01)

(52) U.S. Cl.
USPC .............................................. 726/28; 713/183

(58) Field of Classification Search
CPC ...................................................... G06F 21/31
USPC ............................................................ 726/19
See application file for complete search history.

(56) References Cited

U.S. PATENT DOCUMENTS

| | | | |
|---|---|---|---|
| 5,465,084 A * | 11/1995 | Cottrell | 340/5.27 |
| 5,944,795 A | 8/1999 | Civanlar | |
| 6,484,263 B1 | 11/2002 | Liu | |
| 7,216,361 B1 | 5/2007 | Roskind | |
| 7,289,485 B1 | 10/2007 | Srinivasan | |
| 7,382,867 B2 | 6/2008 | Smith | |
| 7,395,050 B2 | 7/2008 | Tuomi | |
| 7,921,412 B1 * | 4/2011 | Laura | 717/127 |
| 8,260,717 B2 * | 9/2012 | Bauchot et al. | 705/64 |
| 8,645,704 B2 * | 2/2014 | Savagaonkar et al. | 713/182 |
| 8,646,040 B2 * | 2/2014 | Boegelund et al. | 726/3 |
| 2002/0054703 A1 * | 5/2002 | Hiroi et al. | 382/149 |
| 2006/0206918 A1 * | 9/2006 | McLean | 726/2 |
| 2007/0130547 A1 | 6/2007 | Boillot | |
| 2008/0168403 A1 * | 7/2008 | Westerman et al. | 715/863 |
| 2008/0177994 A1 | 7/2008 | Mayer | |
| 2008/0235621 A1 | 9/2008 | Boillot | |
| 2009/0313693 A1 * | 12/2009 | Rogers | 726/21 |
| 2010/0257593 A1 * | 10/2010 | Avelo et al. | 726/4 |
| 2010/0306718 A1 * | 12/2010 | Shim et al. | 715/863 |
| 2011/0041100 A1 | 2/2011 | Boillot | |

* cited by examiner

*Primary Examiner* — Hadi Armouche
*Assistant Examiner* — Bryan Wright
(74) *Attorney, Agent, or Firm* — Law Office of Scott C. Harris, Inc.

(57) ABSTRACT

A user sets a design and uses that to get access to a resource. The design can include lines, and distances of lines, directions and locations. The design can require a user to select a color and can include colors and amounts by which the different entered parts need to overlap.

20 Claims, 4 Drawing Sheets

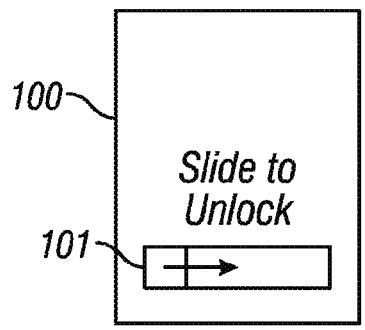
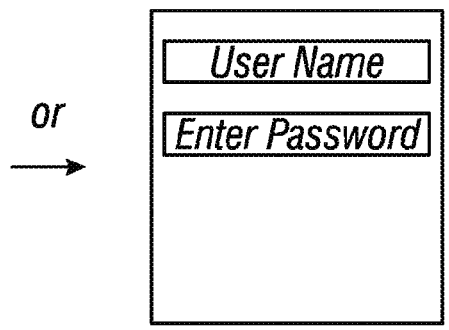
FIG. 1A
FIG. 1B
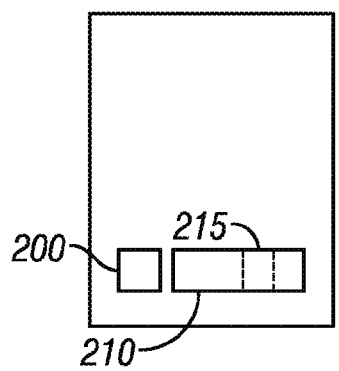
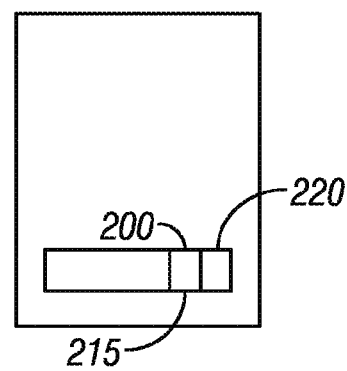
FIG. 2A
FIG. 2B
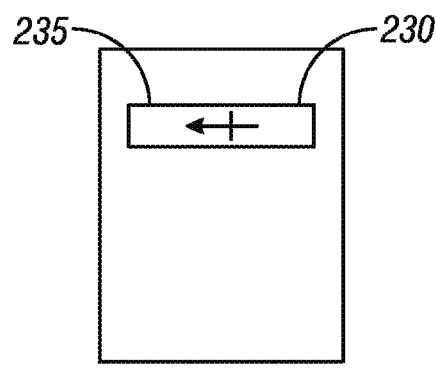
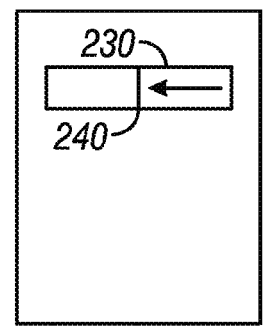
FIG. 2C
FIG. 2D

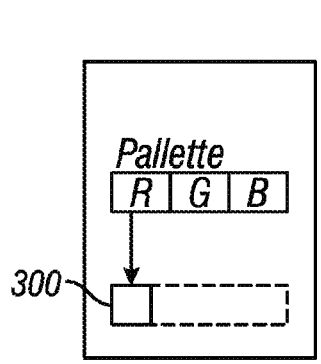
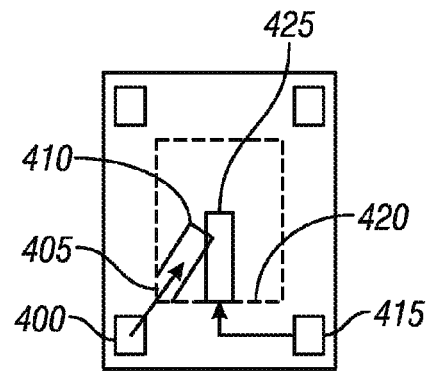
FIG. 3  FIG. 4
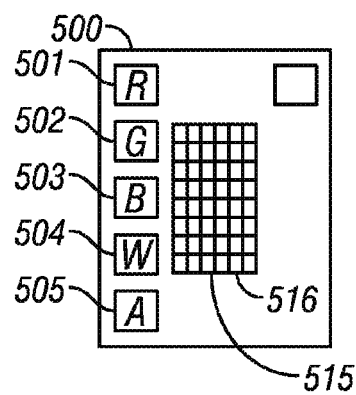
FIG. 5
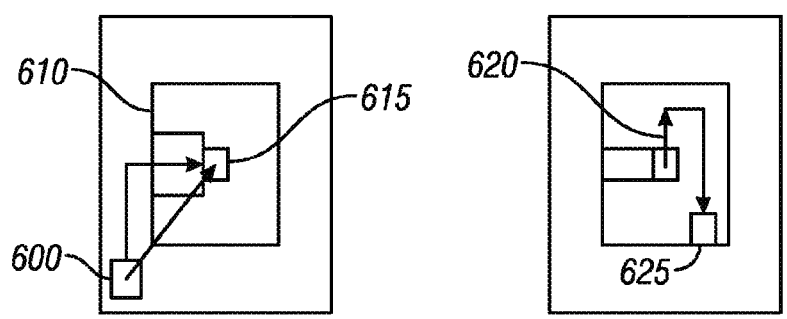
FIG. 6A  FIG. 6B

LOGIN SYSTEM FOR A GRAPHICAL USER INTERFACE USING A PATTERN THAT PROVIDES FEEDBACK ON THE PATTERN

This application claims priority form application No. 61/372,447, filed Aug. 10, 2010, the entire contents of which are herewith incorporated by reference.

BACKGROUND

Computers often require a login or other way of accessing the resources of the computer. There are many different ways of logging in to access these resources.

One way is to use a biometric login system, such as described in my U.S. Pat. No. 7,134,016.

FIG. 1A shows a slide to unlock system such as used in iPod or other Apple products. In this device, a user may touch a touch screen such as 100 at location 101. The device is slid to the right in order to unlock the unit. This is a low security action that may unlock the unit. An alternative, shown in FIG. 1B is often used in which a user name and password can be entered.

The problem with FIG. 1B is that entering the username and password is inconsistent with a graphical user interface, which is inherently graphical. FIG. 1A is graphical, but has very low security.

SUMMARY

The present application recognizes that human brains are very good at recognizing patterns. Since a human sees in terms of shapes and colors, these are interpreted by the eye every day.

Embodiments describe forming a pattern on a surface which is used to gain access to resources of an electronic device.

BRIEF DESCRIPTION OF THE DRAWINGS in the drawings:

FIGS. 1A and 1B show alternative ways of gaining access to computer resources;

FIGS. 2A-2D show a pattern that is used to gain access to a machine.

FIGS. 3-5 show alternative embodiments.

FIGS. 6A and 6B shows a single cursor embodiment;

DETAILED DESCRIPTION

Figure 9A:
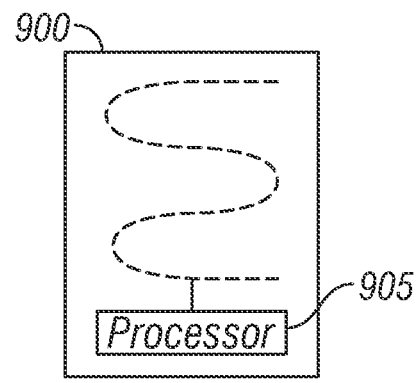
FIG. 9A shows computer hardware for a determining whether the access control has been correct and FIG. 9B shows a flowchart of operation that can be executed by the machine.
Figure 9B:
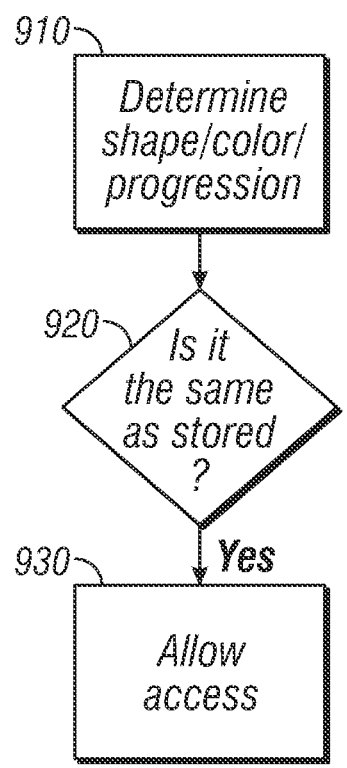

FIG. 9A shows a data entry screen 900 that accepts data being entered, e.g. via touch or the like. While the present application describes this as being a touch screen, other kinds of data entry can be used. The entered data is detected by a processor 905 according to the flowchart of FIG. 9B.

As described herein, this embodiment determines whether the proper cursor position has been entered in the proper sequence. This is used by the system to determine whether access to the machine should be given. In one embodiment, the machine can be a portable computer such as a PDA or cell phone or iPod. In another embodiment, this can be any kind of computer, or any kind of electronic device in general such as a television, remote control, household appliance or the like.

The drawings of the cursor patterns are referred to herein as "patterns", or "designs", which can be lines, curves, and/or shapes or anything else that can be drawn.

At 910, the system determines the shape/color/progression according to the embodiments described herein. 920 determines if the entered data is the same as or sufficiently similar to that which is stored, and if so, 930 allows access.

An overall embodiment requires a user to define a pattern. This may be done, for example, during a training portion which the user enters a pattern that will later be used to allow or disallow access. The pattern, however, may include multiple different parts which must be entered in a specified order. In this embodiment, the order in which the pattern is entered becomes part of the sequence. In another embodiment, the order of entering the patterned parts is ignored, and only the final pattern matters.

A first form of pattern is a slide across pattern like that in FIG. 1A, in which the user decides how far to slide to cursor along the target. FIG. 2A shows the cursor portion 200, and the target portion 210. The cursor portion is pulled across onto the target portion, but instead of being pulled all the way to the end, the cursor is only pulled to a specified area. The area is shown in FIG. 2A as 215, however, the user must know where that area should be located, since that area is part of the login.

FIG. 2B shows the cursor 200 having been pulled to the location 215. In one embodiment, a display e.g. at the end of the pattern may display the number of segments which are still available. For example, if the target portion 210 is pulled to 8 out of 10 possible segments, then the display portion 220 may display the number of segments which are left e.g. one or two. Alternatively, different ways of showing how many segments are left can be used.

This may form the first phase of the login, and only if this is found as okay, the system then monitors for the second phase of the login. In the second phase of the login, there is also a cursor 230 and a target portion 235. In this embodiment, the cursor and target portion are in different locations than the original cursor 200/target portion 210. In this embodiment, the cursor is also moved in a different direction, here from right to left. By putting the cursor in a different location and moving it in a different direction, this facilitates the user remembering that they need to do something different for this part of the login. For example if a combination part one in FIGS. 2A and 2B requires bringing the cursor 200 to a place where there is only one segment left, the user would be going from left to right. In the second part of the login, in FIG. 2C, however, they will be dragging the cursor from right to left, it and can bring the cursor to a different location. It is easier to remember this, since they are in a different location and/or going in a different direction.

FIG. 2D shows the cursor 230 being brought to the location 240, and then released. In this embodiment, for example, there may be eight different portions. FIG. 2D shows the pull to the left stopping at the fourth block.

This system is a relatively low security system, since there are eight possibilities for each. This means that there are only 8×8=64 possibilities. In one embodiment, there may be a "tap out" after three wrong answers, requiring additional security such as a biometric, an answer to a question, or a conventional password.

According to another embodiment, the security can be increased by adding more lines. For example, if there are three separate requirements for three separate lines, then this may provide 8×8×8=512 different possibilities.

Another embodiment may add color to the lines, to add additional security. For example, FIG. 3 shows a palette of red, green and blue, where each of the colors is a specific color that can be dragged to the cursor area 300 to color the line. This means that the user must know where to drag the line, and also needs to know the color to drag to form the line. For example, one combination may be red to the right and stop at −1, while the second one may be blue to the left and stop at −4.

FIG. 3 shows color palettes with red green and blue, but this can require multiple colors to be selected (for example red and green at the same time) or could also choose from more colors, e.g., 10 different colors. The number of possibilities expands geometrically as the different number of selections expands.

Another embodiment shown in FIG. 4 allows the cursor to start in a number of different places, and the user knows which cursor to use to create the combination. For example, each cursor may be required to be pulled into a certain location. FIG. 4 shows the cursor 400 being pulled on to the edge 405 of the active area, and pulled across to roughly the halfway mark at 410. In this embodiment, dragging the cursor leaves a mark across where it is dragged to show a pattern. The cursor 415 is then brought to the location 420, and dragged approximately halfway across to stop at the location 425. Again, this forms a pattern on the surface. Only an authorized user knows the pattern. The specific location where the pattern should be located may be assisted by templates, either lines that appear on the surface, or hints that tell the user how many more "blocks" until completion.

FIG. 5 shows an embodiment where there are different colors in the different cursors. For example, the cursors on the left in cursor block 500 include a red cursor 501, a green cursor 502, a blue cursor 503, a white cursor 504 and an amber cursor 505. There can be any number of these cursors. In this embodiment, the target portion 515 is arranged into a grid of 6×9, with dotted line portions 516 delineating the locations of the 6×9 location. The different cursors can be dragged to different locations on the checkerboard to form a pattern. The user needs to know what colors, and what locations. In one embodiment the user also needs to know what order, but in the embodiment of FIGS. 4 and 5 and those that follow, the final pattern may act as the access key, independent of the order in which the pattern is placed on the surface.

FIGS. 6A and 6B shows a dual movement cursor. This may use any of the embodiments in this application, with only one cursor. In FIG. 6A, the cursor 600 is brought onto the target 610 to a final location 615. After stopping at the final location 615, the cursor is then again moved in the direction of the arrow 620, finally to the final position 625. This movement may be in one dimension or two dimensions. This uses a single cursor system to carry out multiple different movements where the same cursor is moved multiple times.

Figure 7:
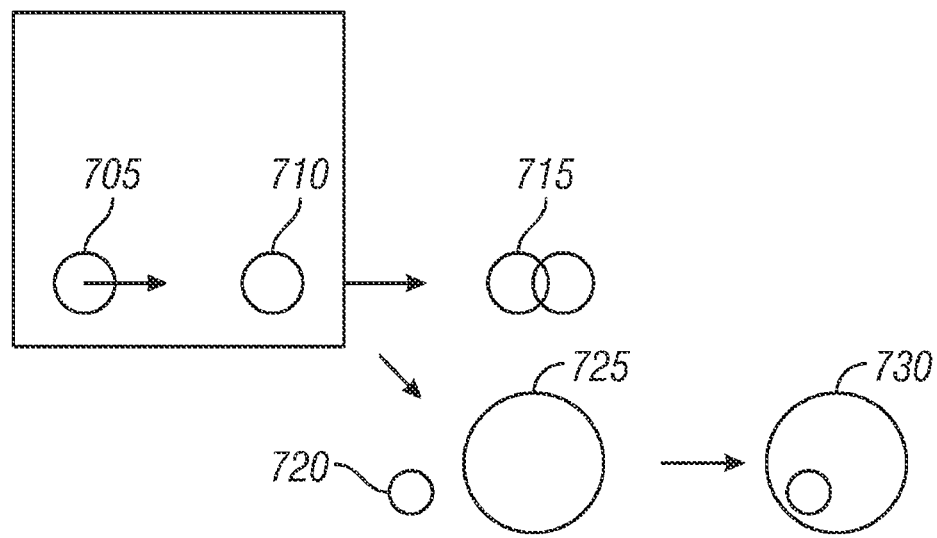
FIG. 7 shows a shape overlap embodiment.

The above has referred to rectangular cursors, however the embodiment of FIG. 7 may modify the above to use any of the above with a circular, oval or otherwise curved cursor. In the round cursor embodiment of FIG. 7, the cursor 705 may be brought towards the target 710 until they overlap as shown at 715. The amount of overlap may be set, and may be part of the secret pattern information possessed by the user. FIG. 7 may also include a small cursor 720 that is brought within a bigger cursor 725 to show the overlap as in 730; determining how much and where one cursor is within the other cursor.

Figure 8:
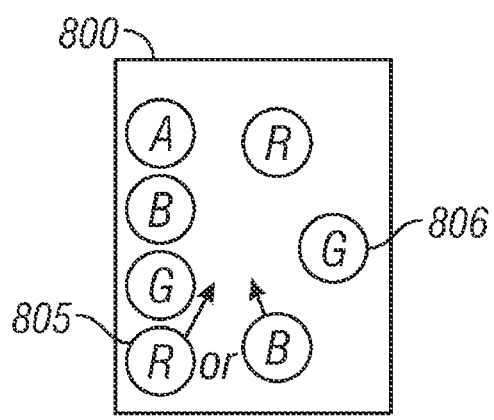
FIG. 8 shows a color matching embodiment.

FIG. 8 allows choosing a color and pulling one color to the other color. For example, in the embodiment of FIG. 8, the small red cursor is brought towards the larger green cursor 806, and left to rest inside the larger cursor at a specified location such as shown in 730. In the embodiment, any cursor can be pulled to another cursor, and left inside the other cursor.

An advantage of these systems is that it forms a design art to represent the login or password. For example, in the subject matter of FIG. 8, the different cursors can be arranged in different ways to form a final design and color. A user can select a color or design that either they like or they have otherwise seen. The user can form that design each time they want access to the resources of the machine.

The above has described that the user sets the design themselves, and then later uses that as an access key to access the machine. According to an alternative embodiment, the machine may have the access key preset therein, and provide that access key to the user. For example, this may be used as a theft prevention mechanism. The machine may have the design preset into it, and only an authorized user is given that design, eg., from a website or other manufacturer or reseller. The design for example may only be disclosed after the user proves that they have paid for the machine. This prevents theft, since a user who steals the machine will not be able to get access to that machine without entering the design. The user who properly gets the machine is given a pattern to enter into the machine which unlocks the machine permanently. Thereafter, the user may set their own pattern, or may set no pattern at all.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other shapes, and colors can be used. The system can use logos, or otherwise personalized in any way. The system may cause additional need for security for example after the tap out, this may require a biometric, question, or a network-based check. When the color palettes are displayed on the screen to be selected, the palettes may be located in randomized locations so that the same section of the screen is not always selected to avoid wearing or otherwise making any kind of mark on the screen which could be identified to determine the color palette. In a similar way, other items that appear on the screen can be randomized in their location to avoid being able to determine the location from the place where the screen has been touched.

The above is described using the system to obtain access to resources of a computer, but alternatively this can provide access to any machine such as a remote control or other.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A portable computer system having
a processor;
a screen, driven by information from the processor and producing at least one viewable part which can be viewed by a user, said screen showing a user interface that allows a user to input at least one pattern that is shown on the screen, wherein during said input being received, displaying pattern segment separate information to be displayed indicating a current segment as the design is being inputted, where the current segment is relative to total available segments, and wherein the separate information is separate information on a display screen;

a memory which stores a defined pattern that represents whether a user is allowed access to resources of the processor; and wherein said processor compares the at least one pattern that is inputted to the defined pattern in the memory, and denies access to said resources of the processor when said at least one pattern does not match the pattern in the memory, and allows access to said resources of the processor when said at least one pattern matches the pattern in the memory, wherein said pattern requires multiple different parts to be in multiple different colors, said user interface also allows selecting different colors as part of said pattern, and said memory stores different colors associated with each of said multiple different parts, and requires said colors to be selected and correctly positioned in order to allow said access to said resources of said processor and where the system includes different cursors associated with the different colors.

2. A system as in claim 1, wherein said defined pattern includes multiple different parts which are separately inputted in separate entries to the user interface, wherein said processor denies access to said resources of the processor when said multiple different parts are not all correctly inputted, and allows access to the resources of the processor only when all of said multiple different parts are correctly inputted.

3. A system as in claim 2, wherein said memory stores an order of entry of the multiple different parts, and wherein said processor denies access to said resources of the processor when said multiple different parts are not inputted in said order, and allows access to the resources of the processor when said multiple different parts are inputted in said order.

4. A system as in claim 1, wherein said defined pattern includes a first line, and a distance of the line and where the pattern segment separate information is an indication of a number of segments that remain among a total possible number of segments that the line can have.

5. A system as in claim 1, wherein said pattern includes blocks, the inputting marks the blocks as the pattern is inputted, and the pattern segment separate information indicates a remaining total number of blocks that can be inputted as the pattern is inputted.

6. A system as in claim 4, wherein said pattern is formed of at least one design part, and said at least one design part includes a total number of areas that can be selected to input the pattern, and said pattern segment separate information includes an indication that is displayed during said user inputting the pattern, and indicative of the pattern being inputted, said pattern segment separate information indicative of how many areas are left among the total number of said areas.

7. A system as in claim 1, wherein said defined pattern in said memory also includes a direction in which parts of the pattern are inputted.

8. A system as in claim 7, wherein said defined pattern in said memory also includes a location from which the parts of the pattern are inputted.

9. A system as in claim 1, wherein said user interface also allows selecting a color as part of said pattern, wherein said defined pattern in said memory includes a color and requires matching to the color before said processor provides said access to said resources and where multiple different colors are selected by selecting different cursors.

10. A method comprising:
in a portable computer, accepting information from a user indicative of a design to be used as an access key to access the portable computer;

storing said design in a memory as an authorized design;

subsequently accepting input indicative of an inputted design on said computer;

displaying the inputted design, as said input is received, wherein during said input being received, displaying pattern segment separate information to be displayed indicating a current segment as the design is being inputted, where the current segment is relative to total available segments, and wherein the separate information is separate information on a display screen; and allowing said access to said portable computer when the inputted design matches the authorized design, and prohibiting said access when the design does not match the authorized design, wherein said inputted design requires multiple different parts to be in multiple different colors, said user interface also allows selecting different colors as part of said pattern, and said memory stores different colors associated with each of said multiple different parts, and requires said colors to be selected and correctly positioned in order to allow said access to said resources of said processor and where the system includes different cursors associated with the different colors.

11. A method as in claim 10, wherein said authorized design includes an order in which the multiple different parts must be inputted, and wherein said allowing and prohibiting includes denying denies access to said portable computer when said multiple different parts are not inputted in said order, and allowing access to the portable computer when said multiple different parts are inputted in said order.

12. A method as in claim 11, wherein said design includes a first line, and said authorized design includes a distance of the line that is inputted, and wherein said pattern segment separate information includes displaying information indicative of the distance of a line that is inputted as that line is inputted as an indication of number of segments of the line that remain among a total possible number of segments that the line can have.

13. A method as in claim 11, wherein said parts each include a total number of areas that can be selected to input the design, and said pattern segment separate information includes an indication that is displayed during said input indicative of the design being inputted, said pattern segment separate information indicative of how many areas are left among the total number of said areas.

14. A portable computer system having
a processor;
a screen, driven by information from the processor and producing at least one viewable part which can be viewed by a user, said screen showing a user interface that allows a user to input at least one design part that is shown on the screen in any of a number of colors, where each of the colors is selected by selecting a specific cursor for a specific color, where different color cursors have different shapes and where there are multiple different color cursors which can be selected;

a memory which stores a defined design that represents whether a user is allowed access to resources of the processor including a color of the design; and wherein said processor compares the at least one design part that is inputted to the defined design in the memory, and denies access to said resources of the processor when a color of said at least one design part does not match a corresponding color of the design in the memory, and wherein during said input being received, displaying pattern segment separate information to be displayed indicating a current segment as the design is being inputted, where the current segment is relative to total available segments, and wherein the separate information is separate information on a display screen.

15. A system as in claim 14, wherein said defined design includes multiple different parts which are separately inputted in separate entries to the user interface, wherein said processor denies access to said resources of the processor when said multiple different parts are not all correctly inputted including at least a location of said parts and colors of said parts, and allows access to the resources of the processor only when all of said multiple different parts are correctly inputted including at least locations of said parts and colors of said parts and where the defined design requires multiple different colors to be input as part of the design.

16. A system as in claim 15, wherein said processor causes said at least one design part to be displayed as the at least one design part is being inputted, and also provides pattern segment separate information to be displayed on the screen indicating a current position relative to total available segments as the pattern is being inputted on the screen.

17. A system as in claim 16, wherein defined patterns includes different colors for said different parts, where said parts include a line and the pattern segment separate information is an indication of a number of segments that remain among a total number of segments of the line.

18. The system as in claim 16, wherein said separate information is an indication which indicates a total number of segments that can be selected to input the design part, and said pattern segment separate information includes text that is displayed during said input indicative of the design being inputted, said pattern segment separate information indicative of how many areas are left relative to the total number of said segments.

19. The system as in claim 1, wherein said pattern segment separate information includes text indicating a number of segments that have been inputted relative to the total available segments.

20. The method as in claim 11, wherein said pattern segment separate information includes text indicating a number of indicating a number of segments that have been inputted relative to the total available segments.

* * * * *